Jan. 3, 1967   O. E. MILLER ET AL   3,296,111

METHOD FOR TREATING IONIC LIQUIDS

Filed Oct. 7, 1965

INVENTORS
Omer E. Miller
Frank J. Wolf
BY
Bacon & Thomas
ATTORNEYS

United States Patent Office 3,296,111
Patented Jan. 3, 1967

3,296,111
METHOD FOR TREATING IONIC LIQUIDS
Omer E. Miller, South Plainfield, and Frank J. Wolf, Westfield, N.J., assignors to Deionall Corporation, Westfield, N.J., a corporation of New Jersey
Filed Oct. 7, 1965, Ser. No. 493,624
9 Claims. (Cl. 204—180)

This application is a continuation-in-part of our copending application Serial No. 149,374 now U.S. Patent No. 3,251,764 filed November 1, 1961, which describes and claims the novel apparatus.

This invention relates to an improved method for deionization, demineralization or ion-concentration of water or other ionic liquids. More particularly, the invention relates to a novel technique for utilization of ion exchange resins in an electro-dialysis cell which makes possible a substantial enhancement of ion-removing capacity and a substantial decrease in electrical power consumption.

The primary object of the invention is to provide a highly efficient and effective method for deionizing, demineralizing or concentrating ionic liquids.

Another object of the invention is to provide a simple and economical method for the production of high quality water from water containing undesired ions.

Another object of the invention is to provide an improved method for reducing the ion content of ionic fluids whereby uniformity of performance over a prolonged period of time is assured.

Various approaches to deionization by electrodialysis have been disclosed, with the most effective previous results being obtained using a mixed bed of anion exchange resin and cation exchange resin between ion-permeable membranes, and passing a direct electrical current through said membranes and bed.

The improved method of the present invention, is one of its aspects, comprises the treatment of water or other ionic liquid to reduce its ion content by passing such liquid sequentially through a plurality of alternately disposed beds of anion and cation exchange materials contained between a pair of ion-permeable walls or membranes, bounded by electrode compartments containing an anode and a cathode, respectively, the anion exchange beds contacting only that ion-permeable membrane nearest the anode compartment and the cation exchange beds contacting only that ion-permeable membrane nearest the cathode compartment, and simultaneously passing a direct current between the anode and cathode through the membranes and the anion and cation exchange beds.

The ion exchange beds, in a preferred embodiment, are in the form of essentially wedge-shaped segments with the base of each segment falling along one ion-permeable wall or membrane, and the apex thereof extending almost to, but slightly short of the opposed ion-permeable wall or membrane. It will be understood, however, that ion exchange segments of other configuration may be employed without departing from the general principle of the invention, providing each segment has a substantial contact area along one of said permeable membranes, with adjacent segments being in contact with a different one of the membranes and extending toward but terminating short of a respective opposed membrane.

It will thus be understood that as water or other ionic liquid to be treated advances progressively through the several interfitting segments, the ions removed in each segment migrate, under the force of the applied electrical current from the apex near one membrane toward the base of each chamber and through the ion-permeable membrane with which it is in contact. In this way, the entire membrane or barrier is useful for the transport of similarly charged ions.

The ions passing through the membranes are removed by passing rinse liquid along the outer faces of the membranes, concentration of ions in the rinse liquid thereby being effected. The invention, if desired, may be used for ion-concentration purposes by passing the liquid to be concentrated through a selected chamber or chambers bounding an ion exchange compartment. Liquid from anode and cathode chambers may be separately collected or combined as desired.

Desirably, in water deionization, the rinse liquid from the anode compartment is used in the cathode compartment. The rinse liquid may be passed along the outer faces of the membranes in a generally countercurrent direction of flow with respect to the direction of flow through the treating chamber.

As with other electrodialysis systems, the method can be carried out with a single cell, with an electrode adjacent the outer surface of the ion-permeable membranes, or with a multiple cell unit having a plurality of cells separated by electrolyte chambers and with the two outermost cells carrying an anode chamber and a cathode chamber respectively.

Other features and advantages of the improved technique of the present invention include the following:

(a) The entire surface of each membrane is utilized for ion transport since it is in contact with only one type of resin.

(b) The arrangement of resins, once established, is maintained during operation of the cell, as the flow of water does not cause the resins to be shifted due to differences in density or size.

(c) The deionization (ion exchange) effect is more efficient since there is substantially no channeling of fluids through the apparatus, even at relatively low flow rates.

(d) The system makes possible the use of different kinds of resins within the same cell. For example, in the first stages of the cell (in the first few anion resin chambers), an anion resin having a weaker base strength but higher binding capacity can be used, while the later stages can contain a strong base resin for the removal of weaker acids. In a similar way, the total ion binding power of each stage can be varied and predetermined by using resins of suitable charge density and/or particle size, thus providing for maximum and uniform utilization of the membrane surface.

(e) The relative amounts of anion exchange resin and cation exchange resin need not be equal, but can be varied by altering the contour of the subdividing means. Thus, for example, a series of segments or chambers receiving one type of resin can have a convex or expanded wedge-shaped contour interfitting with a series of compartments for the other type resin having a concave or contracted wedge-shaped contour.

(f) Because each membrane is contacted only by anion exchange resin, or by cation exchange resin, various types of ion-permeable membranes can be employed, although it is preferable to employ permselective membranes.

This invention will be more readily understood from a consideration of the accompanying drawing in which.

Figure 1:
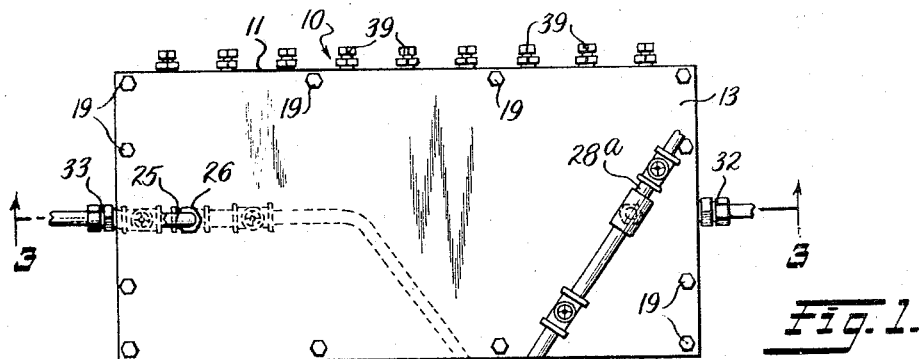
FIG. 1 is an exterior plan view of a representative deionizing apparatus which may be used for carrying out the method of the present invention.
Figure 2:
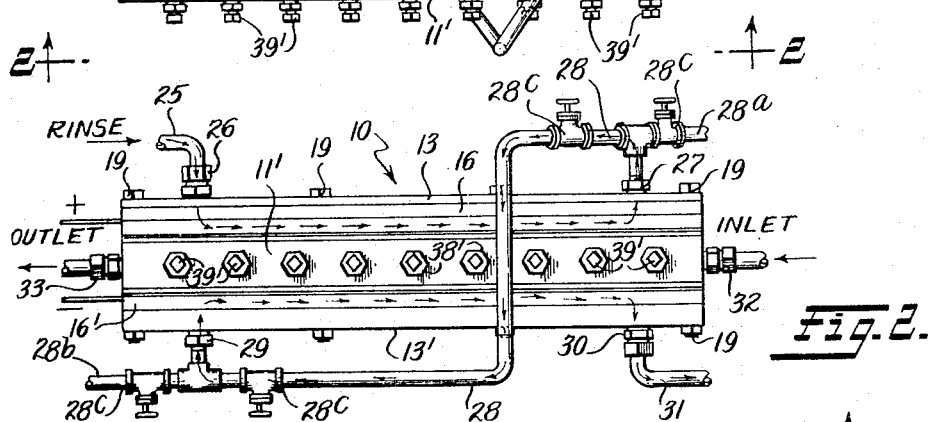
FIG. 2 is a side elevation taken in the direction of the arrows 2—2 as shown in FIG. 1.
Figure 3:
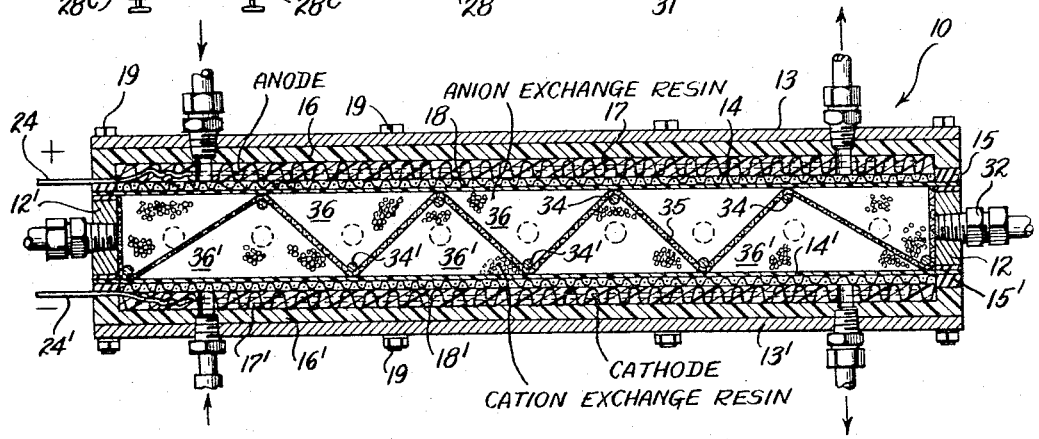
FIG. 3 is an enlarged vertical cross-section substantially along the lines 3—3 as seen in FIG. 1.

As shown in FIG. 1 of the drawing, deionization cell 10 is made up of a rectangular frame providing side walls 11, 11' and end walls 12, 12'. The frame is covered by cover plates 13, 13' having a peripheral contour conforming to that of said central core. Interposed between the central core and the cover plates are ion-permeable membranes 14, 14', gaskets 15, 15' of electrically insulating material and peripherally flanged electrode backing members 16, 16', also formed of electrically insulating material.

Within and substantially filling the space provided between the membranes 14, 14' and backing members 16, 16' are arranged fluid-permeable spacer and support members 18, 18', of plastic screen or the like, and electrode assemblies 17, 17'. The several interposed members are held firmly clamped between the cover plates 13, 13' and the central frame by a plurality of bolts 19 suitably spaced around the periphery thereof.

Each electrode assembly may comprise a coarse mesh plastic screen with a multiply branched electrode incorporated therein. The electrodes are connected to leads 24, 24' which pass between the gaskets 15, 15' and backing members 16, 16' for coupling with an external power source. In thus supporting the branched electrode within the interstices of a coarse plastic screen, the electrode is held uniformly spaced from the adjacent ion-permeable membrane while at the same time providing intimate contact with rinse water and electrolyte which is circulated through the mesh support and around the electrode.

In the drawing, the plain numbered components 14, 15, 16, 17, 18 and 24 are associated with the anode and anode compartment, and the prime numbered components 14', 15', 16', 17', 18' and 24' are associated with the cathode and cathode compartment of the cell. While various materials can be used, respectively, in the anode and cathode, it has been found that stainless steel is quite satisfactory for the cathode, but that platinum or platinum-coated wire is preferred for the anode. The ion-permeable membranes 14, 14, can be of nonselective materials such as the woven fabrics of natural or synthetic materials conventionally employed in the art, or may be permselective with the membrane 14 being formed of anion exchange material and the membrane 14' being formed of cation exchange material. Illustrative of such membranes are those formed in accordance with the disclosures of U.S. Patent No. 2,681,319 and No. 2,681,320 issued to George W. Bodamer.

For circulation of rinse liquid (or liquid to be concentrated) through the electrode chambers, a plurality of ports and pipe couplings are associated with the cover plates 13, 13' and backing members 16, 16' so that rinse liquid through a feed line 25 enters the anode compartment at intake coupling 26 and is discharged through outlet coupling 27 through return line 28 leading to inlet coupling 29 of the cathode chamber, the combined electrolyte being discharged through outlet coupling 30 and discharge line 31. The couplings and associated pipe lines are of insulating material and are of such internal diameter that the liquid contained therein does not provide a substantial short circuit of electrical power. The fluid-permeable spacer members 18, 18' serve to disperse the rinse liquid over the surfaces of the membranes so that substantially the entire area is effectively rinsed. It will be noted that the flow of rinse water is countercurrent to the flow of liquid in the treating compartment. The rinse liquid in the anode compartment becomes slightly acidic and is to some extent neutralized during passage through the cathode compartment.

While the preferred manner of operation for water-deionization has been described, it will be understood that separate streams of liquid may be employed in parallel flow through the electrode compartments and that concurrent as well as counter-current flow through these compartments with respect to the flow through the treating compartment is contemplated. Auxiliary lines 28a and 28b and valves 28c also of insulating material, associated with the various flow lines permit flexibility of operation. Thus, line 28a may be used as an anode discharge and line 28b as a cathode inlet.

Flow of liquid to be treated in the middle compartment of the cell is effected by introducing the raw liquid through an inlet coupling 32 in end wall 12 and discharging treated liquid through an outlet coupling 33 in end wall 12'.

Extending between side walls 11, 11' of the central core are a plurality of spaced rods or guides 34 adjacent the membrane 14, and a plurality of similarly spaced rods or guides 34' adjacent the membrane 14', the latter rods 34' being in uniformly staggered relationship to the rods or guides 34. A fine mesh plastic screen 35 is laced in zigzag fashion around the rods or guides 34, 34' and anchored in a taut position, a plurality of wedge-shaped chambers 36 having the bases thereof along the membrane 14, and a plurality of wedge-shaped chambers 36' having the bases thereof along the membrane 14'.

The several chambers 36 are filled with particled anion exchange resin, and the several chambers 36' are filled with particled cation exchange resin. Thus, when liquid to be treated passes through the cell, it must necessarily be brought into repeated alternate contact with bodies of anion exchange resin and cation exchange resin. The liquid upon entering the cell is dispersed at the inlet throughout the width of the cell and advances as a body through the staggered beds of exchange resin.

The ion exchange materials within the alternately disposed beds are preferably in the form of discrete particles known to the art as resin beads. The beads are of synthetic organic polymeric anion and cation exchange resins, respectively. As previously mentioned, all of the anion exchange material may be of the same type and all of the cation exchange material may be of the same type. Alternatively, different anion exchange chambers may be packed with anion exchange material of different binding strength and, likewise, cation exchange material of different binding characteristics can be packed in the different cation exchange chambers. The resin beads are packed within the respective chambers with sufficient pressure to ensure substantial contact with each other and with the ion exchange membranes and dividing walls and so that shifting of the beads within the beds is virtually eliminated. The degree of packing pressure, however, should not be sufficient to cause distortion of the chamber walls or retard the passage of liquid through the beds. The chamber may be prefilled with resin beads during assembly of the structure, or may be filled after cell structure assembly by means hereinafter described.

In alignment with each of the resin chambers 36, 36', the side walls 11, 11' of the frame are provided with apertures providing access to the interior of the resin chambers for filling and removing resin from the same, for cleaning the resin from time to time, and/or for adjusting resin packing pressure. Normally, these apertures are closed by means of removable plugs 39, 39' of insulating material.

For washing of resin within chambers 36 or 36' the plugs 39, 39' of opposed apertures may be removed, a hose of plastic or the like attached in place of the plug in one aperture and water flushed through the ion exchange bed and out the open aperture on the other side. A screen may be used to prevent escape of the resin from the chamber while permitting free circulation and discharge of wash water, and the like.

It will be recognized that with the support for the membranes, the relatively tightly packed resin beds and the spacing and positioning of the electrodes which is provided, coupled with the fact that the flow of water being treated and flow of rinse through the electrode compartments may be under pressure, the cell can function properly in any attitude or orientation, with or without the aid or influence of gravity.

The selection of particular anion exchange resins and cation exchange resins will depend in part in the amount and nature of ionic material in the water or other liquid to be treated, and in part on the degree of deionization or demineralization called for in the treated liquid. Thus, the invention can be employed for purposes as diverse as converting brackish water to potable water or producing essentially ion-free water as a substitute for distilled water.

The bodies of ion exchange resins represents a reserve capacity in the operation of the cell which can either be increased by the passage of excess electrical energy through the cell, or decreased by the passage of excess ionic material through the cell. Following any change in operating conditions, i.e., type of resin, electrical current, or flow of ionic material, the cell will require a period of several hours to acquire a "steady state" condition. After reaching such "steady state" condition, the cell operates for long periods of time with a high degree of uniformity, and the most meaningful performance data is obtained when the cell is operating at a "steady state" condition.

In order that the advantages of the invention can be clearly visualized, there is presented herewith an example showing comparative operation of the new technique with mixed resin bed technique.

*Example*

Having reference to the drawing, two cells were employed each having a core 11 providing a resin chamber approximately 6" wide, 12" long and ½" thick, with opposed faces covered with an anion-permeable membrane and a cation-permeable membrane respectively. Both were equipped with similar carbon electrodes (platinum preferred for more extended operation) covering the same area of approximately 6" x 12".

In one cell, hereinafter referred to as the "Segmented Bed Cell," rods 34, 34' were placed at ½" intervals in a staggered arrangement such as shown in the drawing, and plastic screening was woven around them in zigzag fashion to form a plurality of wedge-shaped resin chambers. The chambers 36' adjacent the cation-permeable membrane were filled with a cation exchange resin of the sulfonic acid type (IONAC C-240) and the chambers 36 adjacent the anion-permeable membrane were filled with a strongly basic anion-exchange resin (A-540).

In the other cell, hereinafter referred to as the "Mixed Bed Cell," anion exchange resin and cation exchange resin of the same types and from the same manufacturer's lots as used in the Segmented Cell were uniformly mixed and placed between the membranes. The volume of resin used in the Mixed Bed Cell was a little greater (about 10%) than that of the Segmented Cell, since the interior of the latter was partially occupied by the rods and screening.

The cells were operated by flowing water from a municipal water supply (Westfield, New Jersey—partially softened by conventional sodium exchange) through the ion exchange beds for deionization. For rinsing, water from the feed stream was flowed through the anode compartment where it picked up anions, e.g. $Cl^-$, passing through the anion-permeable membrane, then through the cathode compartment where its salt concentration increased due to combinations of anions with cations, e.g., $Na^+$, passing through the cation-permeable membrane. Flow conductivity cells were placed in the water stream entering the cell and in the exit streams. During operation the flow of water was controlled by a pressure-regulating valve followed by calibrated orifices. Direct current electric power was obtained by full wave rectification of the output of a variable autotransformer. Dissolved solids as derived from conductivity were recorded in all instances as p.p.m. of NaCl.

Measurements made during operation of the cells were:
(1) Time of operation—elapsed time meter.
(2) Conductivity of feed solution—periodic check.
(3) Conductivity of rinse solution or waste stream—periodic check.
(4) Conductivity of treated stream—continuous (pen and ink) recording and periodic check.
(5) Rates of flow of treated and rinse streams—periodic check.
(6) Current demand—periodic check.
(7) Voltage—periodic check.

In the operation of the cells, flow rates and voltage were varied from time to time. In the following tables pertinent performance data under various operating conditions for the two cells are presented, all values representing "steady state" conditions after the adjustment of the voltage and/or flow rate to the stated amount.

TABLE I.—PERFORMANCE OF "SEGMENTED BED CELL"

| Time (Hrs.) | Feed, p.p.m. | Feed Flow, ml./sec. | Effluent, p.p.m. | Percent Deionization | Volts | Current flow, M.A. | Percent Current eff. |
|---|---|---|---|---|---|---|---|
| 12.9 | 116 | 2.5 | 9 | 92.4 | 15 | 540 | 98.5 |
| 130.0 | 116 | 2.5 | 7 | 94.0 | 15 | 600 | 87.4 |
| 140.0 | 116 | 7.5 | 76 | 34.5 | 15 | 800 | 72.0 |
| 156.0 | 116 | 7.5 | 8 | 93.0 | 40 | 2,600 | 66.6 |
| 255.6 | 108 | 2.2 | 8 | 92.6 | 15 | 460 | 91.5 |
| 348.2 | 112 | 2.0 | 9 | 92.0 | 40 | 620 | 63.6 |
| 354.9 | 112 | 7.5 | 67 | 40.2 | 40 | 660 | 98.0 |
| 380.5 | 112 | 6.7 | 31 | 72.3 | 35 | 1,600 | 65.0 |
| 418.9 | 112 | 6.7 | 28 | 74.9 | 50 | 2,400 | 58.3 |
| 429.9 | 112 | 6.7 | 10 | 91.1 | 50 | 2,000 | 65.5 |
| 467.0 | 116 | 2.3 | 5 | 95.8 | 20 | 680 | 69.0 |
| 477.5 | 116 | 2.3 | 6 | 94.8 | 20 | 680 | 71.2 |
| 516.0 | 118 | 2.3 | 23 | 80.6 | 17 | 520 | 59.0 |
| 528.4 | 118 | 2.3 | 5 | 95.8 | 30 | 860 | 57.9 |
| 548.5 | 118 | 2.3 | 3 | 97.5 | 30 | 740 | 68.6 |
| 576.4 | 104 | 4.0 | 7 | 83.1 | 50 | 1,100 | 46.8 |
| 600.1 | 106 | 4.0 | 5 | 95.2 | 58 | 2,000 | 38.8 |
| 625.1 | 130 | 4.0 | 7 | 94.5 | 50 | 1,400 | 67.1 |
| 649.4 | 120 | 3.6 | 5 | 95.5 | 50 | 1,400 | 61.0 |
| 710.7 | 108 | 2.1 | 10 | 90.7 | 25 | 660 | 59.8 |
| 780.1 | 116 | 3.1 | 14 | 87.1 | 40 | 1,200 | 50.1 |

TABLE II.—PERFORMANCE OF "MIXED BED CELL"

| Time (hrs.) | Feed, p.p.m. | Feed Flow, ml./sec. | Effluent, p.p.m. | Percent Deionization | Volts | Current flow, M.A. | Percent Current eff. |
|---|---|---|---|---|---|---|---|
| 42.4 | 106 | 1.88 | 23 | 28.3 | 15 | 680 | 44.0 |
| 83.5 | 108 | 1.87 | 13 | 82.5 | 15 | 1,000 | 34.0 |
| 121.0 | 108 | 2.06 | 52 | 52 | 25 | 740 | 30.1 |
| 146.0 | 108 | 2.06 | 27 | 75 | 20 | 420 | 77.5 |
| 179.9 | 114 | 2.06 | 28 | 75.2 | 25 | 600 | 51.5 |
| 237.0 | 114 | 1.43 | 11 | 90.2 | 25 | 660 | 41.5 |
| 300.0 | 104 | 0.418 | 6 | 94.5 | 25 | 660 | 11.8 |
| 334.0 | 116 | 1.87 | 14 | 87.0 | 50 | 2,200 | 16.7 |
| 344.1 | 106 | 2.3 | 61 | 42.4 | 40 | 1,100 | 18.0 |

In the foregoing tables, "percent current efficiency" is determined by use of Faraday's Constant. Comparison of the data in the tabulations clearly shows that the "Segmented Bed Cell" operation is capable of producing higher quality water at higher current efficiency than the "Mixed Bed Cell" operation.

As a further means for the practical comparison of performance, the foregoing data are converted to efficiency, design, and performance factors, which are defined as follows:

(a) The efficiency factor is the product of percentage deionization and percentage current efficiency. Thus, if a cell removed 100% of all ions entering with a current efficiency of 100%, its efficiency factor would be 1 (100% = 1.00).

(b) The design factor, which reflects the amount of deionization which can be carried out in an amount of time, is obtained by multiplying the flow rate through the apparatus by the percentage deionization achieved. Since the two cells have the same overall size and shape of resin chamber, the feed flow rate can be considered as the flow rate through the apparatus.

(c) The performance factor is obtained by multiplying the design factor by the current efficiency and dividing by the performance, since deionization percentage, flow rate, current efficiency and power consumption are all included.

It will be recognized that individual values obtained for efficiency factor, design factor, and particularly for performance factor which takes in a number of variables, will vary from one set of operating conditions to another due to difficulties in obtaining precise measurements and time required to reach true equilibrium conditions. Attention is directed, however, to the following tabulations of the evaluation factors thus derived from the data in Tables I and II:

TABLE III.—EVALUATION FACTORS—SEGMENTED BED CELL

| Time (Hrs.) | Efficiency factor, ×10⁻² | Design factor | Performance factor |
|---|---|---|---|
| 12.9 | 91.0 | 231 | 1,520 |
| 130.0 | 82.0 | 235 | 1,370 |
| 140.0 | 24.8 | 256 | 1,240 |
| 156.0 | 54.8 | 697 | 1,025 |
| 255.6 | 84.5 | 204 | 1,270 |
| 348.2 | 58.5 | 184 | 292 |
| 354.9 | 39.4 | 302 | 740 |
| 380.5 | 47.0 | 485 | 898 |
| 418.9 | 43.5 | 502 | 145 |
| 429.9 | 59.6 | 610 | 795 |
| 467.0 | 66.0 | 220 | 751 |
| 477.5 | 67.5 | 215 | 356 |
| 516.0 | 47.5 | 185 | 650 |
| 528.4 | 55.5 | 220 | 423 |
| 548.5 | 67.0 | 224 | 510 |
| 576.4 | 39.0 | 332 | 510 |
| 600.1 | 36.8 | 381 | 316 |
| 625.1 | 63.5 | 378 | 890 |
| 649.4 | 58.3 | 344 | 420 |
| 710.7 | 54.3 | 191 | 680 |
| 780.1 | 43.5 | 270 | 337 |
| Average | 56.4 | 317 | 768 |

TABLE IV.—EVALUATION FACTORS—MIXED BED CELL

| Time (Hrs.) | Efficiency factor, ×10⁻² | Design factor | Performance factor |
|---|---|---|---|
| 42.4 | 34.4 | 147 | 430 |
| 83.5 | 29.6 | 163 | 368 |
| 121.0 | 15.6 | 107 | 40 |
| 146.0 | 58.0 | 154 | 750 |
| 179.9 | 38.6 | 155 | 316 |
| 237.0 | 37.4 | 129 | 212 |
| 300.0 | 11.1 | 40 | 40 |
| 377.1 | 7.1 | 97 | 16 |
| Average | 27.4 | 128 | 244 |

Particularly significant in the foregoing tabulations are the average values, which show the advantages of the "Segmented Bed Cell" over the "Mixed Bed Cell" to be about 2× in terms of efficiency factor, 2.5× in terms of design factor, and more than 3× in terms of performance factor.

It will be understood that it is within the scope of the invention to carry out the method in a cell employing any type of ion-permeable wall which will function to prevent mechanical mixing of the concentrated stream with the treated stream. This can be accomplished with varying degrees of efficiency by such materials as porous ceramic, plastic, woven fabrics or even filter papers. In the usual practice, because of pressure differences, thermal effects and the like, the use of membranes is desirable.

Permselective membranes are only necessary when large differences in the concentration of electrolyte in the concentration stream and treated stream exist. Thus, where it is desirable to prepare treated water with only a few parts per million of solids from raw water containing for example, 100 parts per million of dissolved solids with a low concentrate stream flow through the electrode chambers, it is desirable to use permselective membranes.

There are many other conditions in which it is perfectly practical and possibly even desirable to use semi-permeable membranes. For example, the cell may be operated so that the flow of concentrate on the outside of the membrane is substantially equal to the flow of liquid through the ion exchange bed and the solids reduction in the fluid passing through the ion exchange bed is in the order of 70–80%. Some diffusion from the concentrate in this instance does not seriously impair the operation of the cell and the greater durability and faster ion transport across semipermeable membranes may outweigh the advantages of greater selectivity available with permselective membranes.

It will be understood that many types of subdividing means for the resin beds can be employed. It is actually possible to construct a cell utilizing water-soluble dividers so that the assembled device in use contains the triangular shaped resin beds without separating means. In a tightly packed assembly, there is substantially no intermingling of resins of different types.

Various changes and modifications in the improved deionization apparatus as herein disclosed will occur to those skilled in the art, and to the extent that such changes and modifications are embraced by the appended claims, it is to be understood that they constitute part of our invention.

We claim:

1. The method of treating an ionic liquid to alter its ion content, comprising: passing said liquid sequentially through a plurality of alternately disposed beds of anion and cation exchange resin materials contained between a pair of ion-permeable membranes disposed between electrode compartments containing an anode and a cathode respectively, said anion exchange resin beds contacting only that ion-permeable wall nearest the anode compartment and said cation exchange resin beds contracting only that ion-permeable membrane nearest the cathode compartment, and simultaneously passing a direct current between said anode and cathode through said membranes and the beds of ion exchange material.

2. The method of claim 1 wherein said ionic liquid is raw water and wherein the ion-permeable membranes are contacted with rinse water.

3. The method of claim 2 wherein rinse water is passed through the anode compartment and then through the cathode compartment and wherein the flow of rinse water along the permeable membranes is countercurrent to the flow of ionic liquid through the treating compartment.

4. The method of claim 1 wherein the ion-permeable membranes are permselective and ions migrating toward the anode compartment pass through a membrane permselective to anions and ions migrating toward the cathode compartment pass through a membrane permselective to cations.

5. The method of treating an ionic liquid to alter its ion content, comprising: passing said liquid sequentially through a plurality of alternately disposed beds of anion and cation exchange resin materials contained between a pair of ion-permeable walls disposed between electrode compartments containing an anode and a cathode respectively, said anion exchange resin beds contacting only that ion-permeable wall nearest the anode compartment and extending substantially to but terminating short of the ion-permeable wall nearest the cathode compartment, and said cation exchange resin beds contacting only that ion-permeable wall nearest the cathode compartment and extending substantially to but terminating short of the ion-permeable wall nearest to the anode compartment, passing a stream of ionic liquid in contact with the outer surfaces of said ion-permeable walls, and simultaneously passing a direct current between said anode and cathode through said walls and the beds of ion exchange material.

6. The method of claim 5 wherein the stream of ionic liquid passed in contact with the outer surface of the ion-permeable wall nearest the anode is collected to provide a liquid concentrated with respect to anion content.

7. The method of claim 5 wherein the stream of ionic liquid passed in contact with the outer surface of the ion-permeable wall nearest the cathode is collected to provide a liquid concentrated with respect to cation content.

8. The method of claim 5 wherein the streams of ionic liquid passing in contact with the outer surface of the ion-permeable walls on each side of the ion exchange resin beds are combined to provide a more highly concentrated ionic liquid.

9. The method of claim 5 wherein said ionic liquid is raw water and the effluent liquid from said ion exchange beds is substantially demineralized water.

References Cited by the Examiner

UNITED STATES PATENTS

| | | | |
|---|---|---|---|
| 2,763,607 | 9/1956 | Staverman | 204—180 |
| 2,788,319 | 4/1957 | Pearson | 204—180 |
| 2,923,674 | 2/1960 | Kressman | 204—180 |
| 2,980,598 | 4/1961 | Stoddard | 204—180 |
| 3,074,864 | 1/1963 | Gaysowski | 204—180 |

JOHN H. MACK, *Primary Examiner.*

E. ZAGARELLA, *Assistant Examiner.*